United States Patent

Suzuki et al.

[11] Patent Number: 5,069,814
[45] Date of Patent: Dec. 3, 1991

[54] BENZOIC ACID DERIVATIVE HAVING A LARGE POSITIVE DIELECTRIC ANISOTROPY VALUE

[75] Inventors: Toshiharu Suzuki; Yasuyuki Goto, both of Ichiharashi; Kisei Kitano, Chibashi, all of Japan

[73] Assignee: Chisso Corporation, Osaka, Japan

[21] Appl. No.: 480,118

[22] Filed: Feb. 14, 1990

[30] Foreign Application Priority Data

Mar. 2, 1989 [JP] Japan .................................. 1-50592

[51] Int. Cl.$^5$ ...................... C09K 19/20; C09C 69/76; C07C 255/00
[52] U.S. Cl. ...................... 252/299.67; 252/299.01; 560/59; 560/62; 560/64; 560/65; 558/425; 570/129
[58] Field of Search ...................... 252/299.01, 299.66, 252/299.67; 350/350 R; 560/59, 62, 64, 65; 558/425; 570/129

[56] References Cited

U.S. PATENT DOCUMENTS

| | | | |
|---|---|---|---|
| 4,402,855 | 9/1983 | Zann et al. | 252/299.65 |
| 4,550,981 | 11/1985 | Petrzilka et al. | 350/350 R |
| 4,558,151 | 12/1985 | Takatsu et al. | 252/299.63 |
| 4,637,897 | 1/1987 | Kelly | 252/299.63 |
| 4,661,283 | 4/1987 | Sugimori et al. | 252/299.63 |
| 4,707,296 | 11/1987 | Sugimori et al. | 252/299.67 |
| 4,708,441 | 11/1987 | Petrzilka et al. | 252/299.5 X |
| 4,709,030 | 11/1987 | Petrzilka et al. | 252/299.5 X |
| 4,764,619 | 8/1988 | Gunjima et al. | 252/299.61 X |
| 4,770,810 | 9/1988 | Dubois et al. | 252/299.63 |
| 4,822,519 | 4/1989 | Saito et al. | 252/299.61 |
| 4,855,076 | 8/1989 | Goto et al. | 252/299.63 |
| 4,871,472 | 10/1989 | Krause et al. | 252/299.65 |
| 4,894,181 | 1/1990 | Praecke et al. | 252/299.61 |
| 4,925,590 | 5/1990 | Reiffenrath | 252/299.61 |

FOREIGN PATENT DOCUMENTS 2127822 4/1984 United Kingdom ........... 252/299.63

Primary Examiner—Robert L. Stoll
Assistant Examiner—Cynthia Harris
Attorney, Agent, or Firm—Leydig, Voit & Mayer

[57] ABSTRACT

A benzoic acid derivative having a large positive dielectric anisotropy value and a superior compatibility, reducing the threshold voltage value of the resulting liquid crystal cell and being very effective for broadening the mesomorphic range of the resulting liquid crystal compositon and reducing the driving voltage, and a liquid crystal composition containing the derivative are provided, which benzoic acid derivative is expressed by the formula

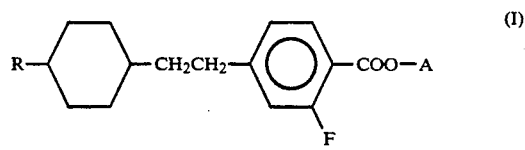

wherein R represents an alkyl group of 1 to 10 carbon atoms and A represents

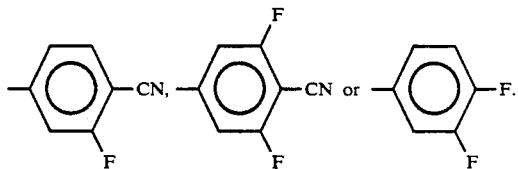

20 Claims, No Drawings

BENZOIC ACID DERIVATIVE HAVING A LARGE POSITIVE DIELECTRIC ANISOTROPY VALUE

BACKGROUND OF THE INVENTION

1. Field of the Invention

This invention relates to a benzoic acid derivative having a large positive dielectric anisotropy value, used as a component of liquid crystal materials, and a liquid crystal composition containing the derivative and having superior characteristics.

2. Description of the Related Art

Liquid crystals have recently been becoming very important as dielectrics for display devices. The reason consists in an electrooptical effect based on the dielectric anisotropy and optical anisotropy of liquid crystal substances. Display modes based on liquid crystals include various modes such as those of dynamic scattering type, twisted nematic type, super twisted nematic type, phase transition type, DAP type, guest-host type, etc. While the properties required for liquid crystal substances used for liquid crystal display vary depending on the respective liquid crystal display modes, a broad mesomorphic range and stability to moisture, air, heat, electricity, etc. are required for any display modes in common therewith. Further, when liquid crystal substances are used for liquid crystal display devices, it is also desired therefore to have a quick response of display elements and to be able to drive the devices under a voltage as low as possible. At present, however, there is no single compound which satisfies all of these requirements, but actually, several kinds of liquid crystal compounds or liquid crystal mixtures obtained by mixing several kinds of liquid crystal compounds with compounds having potentially liquid crystal properties or non-liquid crystal compounds have been used. Thus, it is also required that liquid crystal compounds have a good compatibility with other liquid crystal compounds.

As components of liquid crystal materials, the following ester compounds having a positive dielectric anisotropy value are enumerated:
compounds expressed by the formula

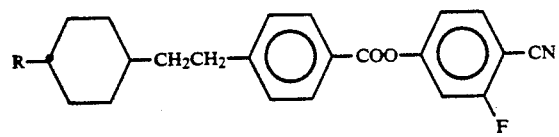

wherein R represents an alkyl group (disclosed in Japanese patent application laid-open No. Sho 60-45549/1985),
compounds expressed by the formula

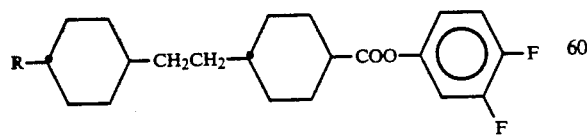

wherein R represents an alkyl group (disclosed in Japanese patent application laid-open No. Sho 59-193848/1984),
compounds expressed by the formula

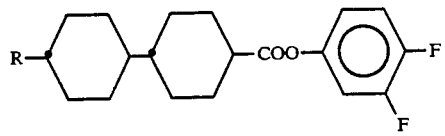

wherein R represents an alkyl group (disclosed in Japanese patent application laid-open No. Sho 60-45549/1985), and compounds expressed by the formula

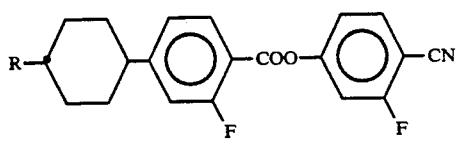

wherein R represents an alkyl group (disclosed in Japanese patent application laid-open No. Sho 62-63549/1987).

SUMMARY OF THE INVENTION

The object of the present invention is to provide a liquid crystal compound and a liquid crystal composition provided with the above-mentioned various characteristics, and particularly to provide a liquid crystal compound and a liquid crystal composition, having a broad mesomorphic range and capable of exhibiting a low driving threshold voltage value of display elements.

The present invention resides in
(1) a benzoic acid derivative expressed by the formula

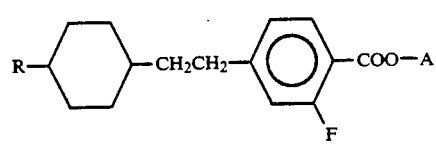

wherein R represents an alkyl group of 1 to 10 carbon atoms and A represents

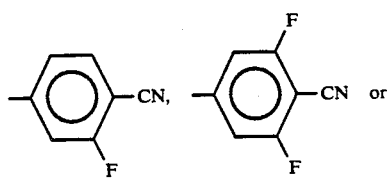

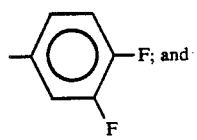

(2) a liquid crystal composition comprising at least two components at least one of which is a benzoic acid derivative of the formula (I) as set forth in the above item (1).

DETAILED DESCRIPTION OF PREFERRED EMBODIMENTS

The benzoic acid derivative of the present invention may be prepared according to the following route:

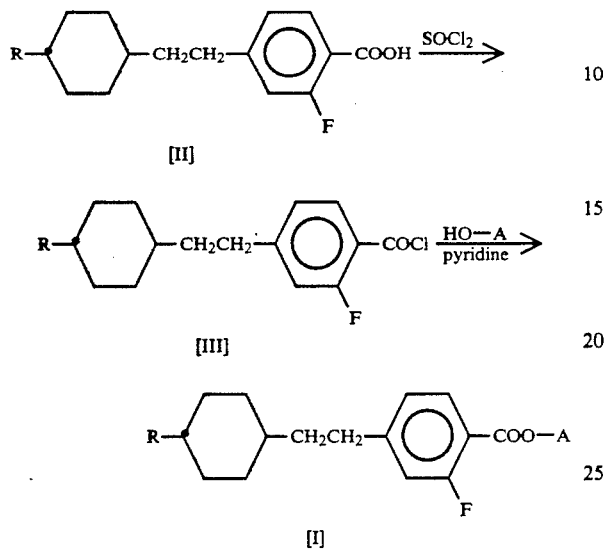

wherein R and A are as defined above. Namely, a substituted carboxylic acid [II] prepared according to a known process (European patent application laid-open No. 0205998) is converted into a substituted carboxylic acid chloride [III] by means of thionyl chloride or the like, followed by reacting the chloride with a substituted phenol (HO-A) in the presence of pyridine to obtain the objective 2-fluoro-4-[2-(trans-4-alkylcyclohexyl)ethyl]benzoic acid derivative [I].

As compounds used in admixture with the compound of the formula (I) as components of the liquid crystal composition of the present invention, known liquid crystalline compounds expressed by the following formulas (i)–(xxxi) are exemplified:

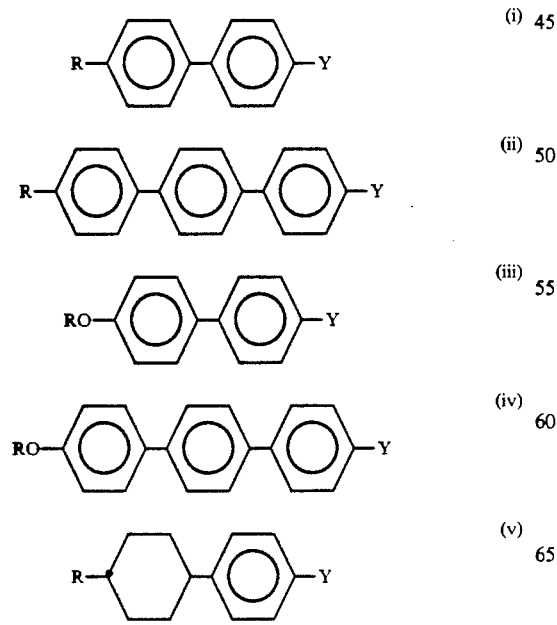

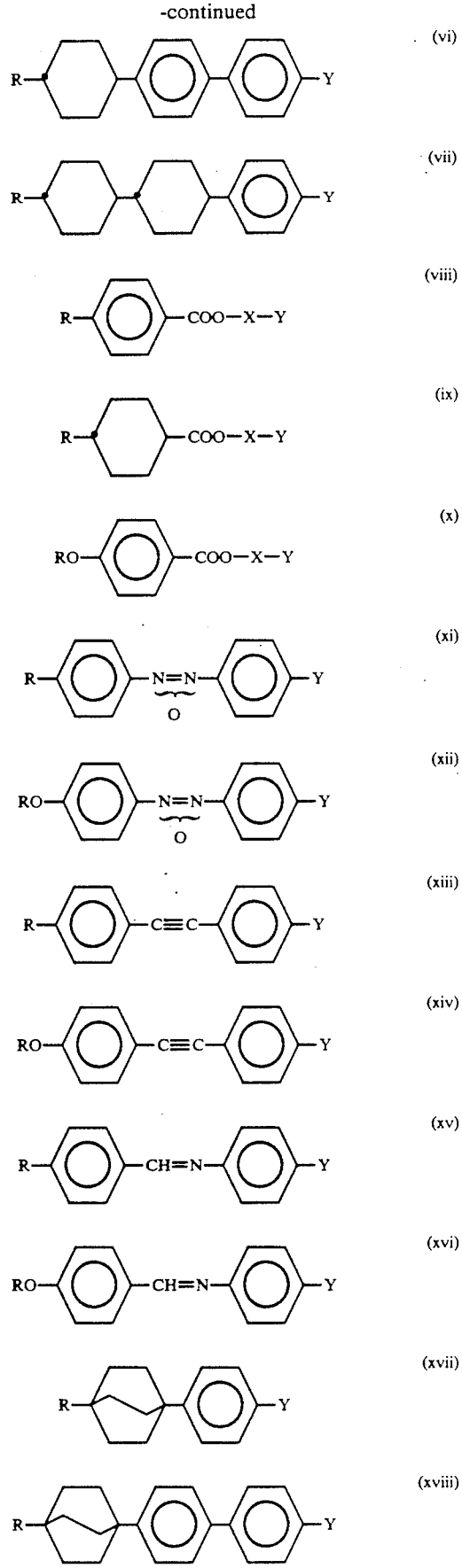

-continued

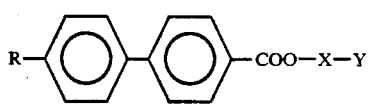

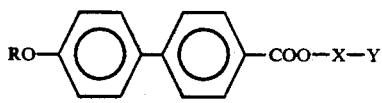

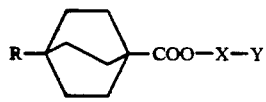

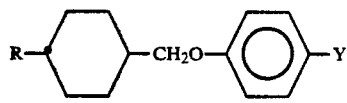

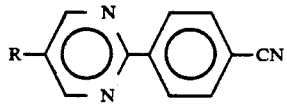

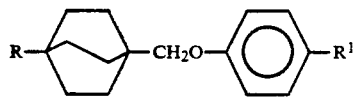

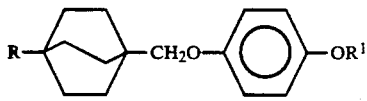

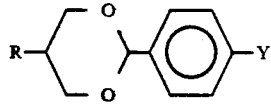

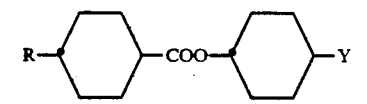

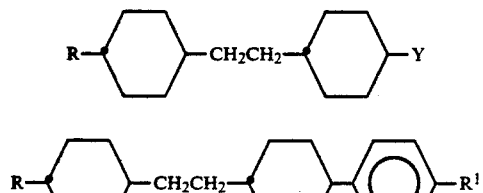

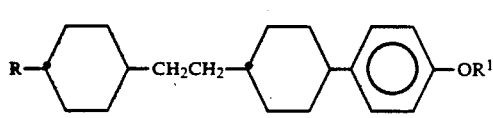

In the formulas (i)-(xxxi), X represents

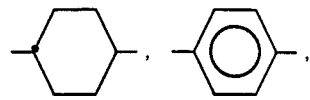

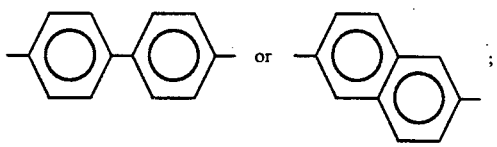

Y represents —CN, a halogen atom, $R^1$ or $R^1O$; and R and $R^1$ each represent an alkyl group or alkenyl group.

The present invention will be described in more detail by way of Examples, but it should not be construed to be limited thereto. Further, in Examples, the phase transition points are abbreviated as follows:

C-N point: crystal-nematic phase transition point

N-I point: nematic phase-isotropic liquid phase transition point.

EXAMPLE 1

Preparation of 2-fluoro-4-[2-(trans-4-ethylcyclohexyl)ethyl]benzoic acid 3-fluoro-4-cyanophenyl ester, i.e. 3-fluoro-4-cyanophenyl-2-fluoro-4-[2-(trans-4-ethylcyclohexyl)ethyl]benzoate Thionyl chloride (4 ml) was added to 2-fluoro-4-[2-trans-4-ethylcyclohexyl)ethyl]benzoic acid (6 g, 0.02 mol), followed by reacting the mixture under reflux for 3 hours, distilling off excess thionyl chloride under reduced pressure, dropwise adding the residue to a solution of 3-fluoro-4-cyanophenol (3.2 g, 0.02 mol) dissolved in pyridine (6 ml) with stirring, heating the reaction mixture at 50° C. for 3 hours, adding water (50 ml) to the reaction material, twice extracting these with toluene (50 ml), washing the resulting toluene layer with 1 N aqueous solution of NaOH, washing the toluene solution with water till the toluene layer became neutral, drying over sodium sulfate, distilling off toluene and recrystallizing the remaining solids from a mixed solvent of benzene/heptane (1 V/10 V), to obtain the objective 2-fluoro-4-[2-(trans-4-ethylcyclohexyl)ethyl]benzoic acid 3-fluoro-4-cyanophenyl ester (5.5 g, yield 64%). This product exhibited liquid crystal phases and C-N point: 55.4° C., N-I point: 134.4° C.

EXAMPLE 2

Example 1 was repeated except that 2-fluoro-4-[2-(trans-4-ethylcyclohexyl)ethyl]benzoic acid of Example 1 (6 g, 0.02 mol) was replaced by 2-fluoro-4-[2-(trans-4-methylcyclohexyl)ethyl]benzoic acid (0.02 mol) to prepare 2-fluoro-4-[2-(trans-4-methylcyclohexyl)ethyl]benzoic acid 3-fluoro-4-cyanophenyl ester.

EXAMPLE 3

Example 1 was repeated except that 2-fluoro-4-[2-(trans-4-ethylcyclohexyl)ethyl]benzoic acid (6 g, 0.02 mol) of Example 1 was replaced by 2-fluoro-4-[2-(trans-4-propylcyclohexyl)ethyl]benzoic acid (0.02 mol) to prepare 2-fluoro-4-[2-(trans-4-propylcyclohexyl)ethyl]benzoic acid 3-fluoro-4-cyanophenyl ester.

C-N point: 50.4° C.
N-I point: 155.3° C.

EXAMPLE 4

Example 1 was repeated except that 2-fluoro-4-[2-(trans-4-ethylcyclohexyl)ethyl]benzoic acid (6 g, 0.02 mol) of Example 1 was replaced by 2-fluoro-4-[2-(trans-4-butylcyclohexyl)ethyl]benzoic acid (0.02 mol) to prepare 2-fluoro-4-[2-(trans-4-butylcyclohexyl)ethyl]benzoic acid,3-fluoro-4-cyanophenyl ester.

C-N point: 47.7° C.
N-I point: 150.6° C.

EXAMPLE 5

Example 1 was repeated except that 2-fluoro-4-[2-(trans-4-ethylcyclohexyl)ethyl]benzoic acid (6 g, 0.02 mol) of Example 1 was replaced by 2-fluoro-4-[2-(trans-4-pentylcyclohexyl)ethyl]benzoic acid (0.02 mol) to prepare 2-fluoro-4-[2-(trans-4-pentylcyclohexyl)ethyl]benzoic acid 3-fluoro-4-cyanophenyl ester.

C-N point: 43.9° C.
N-I point: 153.1° C.

EXAMPLE 6

Example 1 was repeated except that 2-fluoro-4-[2-(trans-4-ethylcyclohexyl)ethyl]benzoic acid (6 g, 0.02 mol) of Example 1 was replaced by 2-fluoro-4-[2-(trans-4-hexylcyclohexyl)ethyl]benzoic acid (0.02 mol) to prepare 2-fluoro-4-[2-(trans-4-hexylcyclohexyl)ethyl]benzoic acid 3-fluoro-4-cyanophenyl ester.

EXAMPLE 7

Example 1 was repeated except that 2-fluoro-4-[2-(trans-4-ethylcyclohexyl)ethyl]benzoic acid (6 g, 0.02 mol) of Example 1 was replaced by 2-fluoro-4-[2-(trans-4-heptylcyclohexyl)ethyl]benzoic acid (0.02 mol) to prepare 2-fluoro-4-[2-(trans-4-heptylcyclohexyl)ethyl]benzoic acid 3-fluoro-4-cyanophenyl ester.

EXAMPLE 8

Example 1 was repeated except that 2-fluoro-4-[2-(trans-4-ethylcyclohexyl)ethyl]benzoic acid (6 g, 0.02 mol) of Example 1 was replaced by 2-fluoro-4-[2-(trans-4-octylcyclohexyl)ethyl]benzoic acid (0.02 mol) to prepare 2-fluoro-4-[2-(trans-4-octylcyclohexyl)ethyl]benzoic acid 3-fluoro-4-cyanophenyl ester.

EXAMPLE 9

Example 1 was repeated except that 2-fluoro-4-[2-(trans-4-ethylcyclohexyl)ethyl]benzoic acid (6 g, 0.02 mol) of Example 1 was replaced by 2-fluoro-4-[2-(trans-4-nonylcyclohexyl)ethyl]benzoic acid (0.02 mol) to prepare 2-fluoro-4-[2-(trans-4-nonylcyclohexyl)ethyl]benzoic acid 3-fluoro-4-cyanophenyl ester.

EXAMPLE 10

Example 1 was repeated except that 2-fluoro-4-[2-(trans-4-ethylcyclohexyl)ethyl]benzoic acid (6 g, 0.02 mol) of Example 1 was replaced by 2-fluoro-4-[2-(trans-4-decylcyclohexyl)ethyl]benzoic acid (0.02 mol) to prepare 2-fluoro-4-[2-(trans-4-decylcyclohexyl)ethyl]benzoic acid 3-fluoro-4-cyanophenyl ester.

EXAMPLE 11

Preparation of
2-fluoro-4-[2-(trans-4-ethylcyclohexyl)ethyl]benzoic acid 3,4-difluorophenyl ester Example 1 was repeated except that 3-fluoro-4-cyanophenol of Example 1 was replaced by 3,4-difluorophenol (2.6 g, 0.02 mol) to prepare 2-fluoro-4-[2-(trans-4-ethylcyclohexyl)ethyl]benzoic acid 3,4-difluorophenyl ester (4.5 g).

C-N point: 32.6° C.
N-I point: 68.9° C.

EXAMPLE 12

Example 11 was repeated except that 2-fluoro-4-[2-(trans-4-ethylcyclohexyl)ethyl]benzoic acid of Example 11 was replaced by 2-fluoro-4-[2-(trans-4-methylcyclohexyl)ethyl]benzoic acid to prepare 2-fluoro-4-[2-(trans-4-methylcyclohexyl)ethyl]benzoic acid 3,4-difluorophenyl ester.

EXAMPLE 13

Example 11 was repeated except that 2-fluoro-4-[2-(trans-4-ethylcyclohexyl)ethyl]benzoic acid of Example 11 was replaced by 2-fluoro-4-[2-(trans-4-propylcyclohexyl)ethyl]benzoic acid to prepare 2-fluoro-4-[2-(trans-4-propylcyclohexyl)ethyl]benzoic acid 3,4-difluorophenyl ester.

C-N point: 40.9° C.
N-I point: 95.8° C.

EXAMPLE 14

Example 11 was repeated except that 2-fluoro-4-[2-(trans-4-ethylcyclohexyl)ethyl]benzoic acid of Example 11 was replaced by 2-fluoro-4-[2-(trans-4-butylcyclohexyl)ethyl]benzoic acid to prepare 2-fluoro-4-[2-(trans-4-butylcyclohexyl)ethyl]benzoic acid 3,4-difluorophenyl ester.

C-N point: 41.7° C.
N-I point: 94.2° C.

EXAMPLE 15

Example 11 was repeated except that 2-fluoro-4-[2-(trans-4-ethylcyclohexyl)ethyl]benzoic acid of Example 11 was replaced by 2-fluoro-4-[2-(trans-4-pentylcyclohexyl)ethyl]benzoic acid to prepare 2-fluoro-4-[2-(trans-4-pentylcyclohexyl)ethyl]benzoic acid 3,4-difluorophenyl ester.

C-N point: 43.7° C.
N-I point: 102.4° C.

EXAMPLE 16

Example 11 was repeated except that 2-fluoro-4-[2-(trans-4-ethylcyclohexyl)ethyl]benzoic acid of Example 11 was replaced by 2-fluoro-4-[2-(trans-4-hexylcyclohexyl)ethyl]benzoic acid to prepare 2-fluoro-4-[2-(trans-4-hexylcyclohexyl)ethyl]benzoic acid 3,4-difluorophenyl ester.

EXAMPLE 17

Example 11 was repeated except that 2-fluoro-4-[2-(trans-4-ethylcyclohexyl)ethyl]benzoic acid of Example 11 was replaced by 2-fluoro-4-[2-(trans-4-heptylcyclohexyl)ethyl]benzoic acid to prepare 2-fluoro-4-[2-(trans-4-heptylcyclohexyl)ethyl]benzoic acid 3,4-difluorphenyl ester.

EXAMPLE 18

Example 11 was repeated except that 2-fluoro-4-[2-(trans-4-ethylcyclohexyl)ethyl]benzoic acid of Example 11 was replaced by 2-fluoro-4-[2-(trans-4-octylcyclohexyl)ethyl]benzoic acid to prepare 2-fluoro-4-[2-(trans-4-octylcyclohexyl)ethyl]benzoic acid 3,4-difluorophenyl ester.

EXAMPLE 19

Example 11 was repeated except that 2-fluoro-4-[2-(trans-4-ethylcyclohexyl)ethyl]benzoic acid of Example 11 was replaced by 2-fluoro-4-[2-(trans-4-nonylcyclohexyl)ethyl]benzoic acid to prepare 2-fluoro-4-[2-(trans-4-nonylcyclohexyl)ethyl]benzoic acid 3,4-difluorophenyl ester.

EXAMPLE 20

Example 11 was repeated except that 2-fluoro-4-[2-(trans-4-ethylcyclohexyl)ethyl]benzoic acid of Example 11 was replaced by 2-fluoro-4-[2-(trans-4-decylcyclohexyl)ethyl]benzoic acid to prepare 2-fluoro-4-[2-(trans-4-decylcyclohexyl)ethyl]benzoic acid 3,4-difluorophenyl ester.

EXAMPLE 21

Preparation of 2-fluoro-4-[2-(trans-4-ethylcyclohexyl)ethyl]benzoic acid-3,5-difluoro-4-cyanophenyl ester Example 1 was repeated except that 3-fluoro-4-cyanophenol of Example 1 was replaced by 3,5-difluoro-4-cyanophenol (3.1 g, 0.02 mol) to prepare 2-fluoro-4-[2-(trans-4-ethylcyclohexyl)ethyl]benzoic acid 3,5-difluoro-4-cyanophenyl ester (4.7 g).

EXAMPLE 22

Example 21 was repeated except that 2-fluoro-4-[2-(trans-4-ethylcyclohexyl)ethyl]benzoic acid of Example 21 was replaced by 2-fluoro-4-[2-(trans-4-methylcyclohexyl)ethyl]benzoic acid to prepare 2-fluoro-4-[2-(trans-4-methylcyclohexyl)ethyl]benzoic acid 3,5-difluoro-4-cyanophenyl ester.

EXAMPLE 23

Example 21 was repeated except that 2-fluoro-4-[2-(trans-4-ethylcyclohexyl)ethyl]benzoic acid of Example 21 was replaced by 2-fluoro-4-[2-(trans-4-propylcyclohexyl)ethyl]benzoic acid to prepare 2-fluoro-4-[2-(trans-4-propylcyclohexyl)ethyl]benzoic acid 3,5-difluoro-4-cyanophenyl ester.

EXAMPLE 24

Example 21 was repeated except that 2-fluoro-4-[2-(trans-4-ethylcyclohexyl)ethyl]benzoic acid of Example 21 was replaced by 2-fluoro-4-[2-(trans-4-butylcyclohexyl)ethyl]benzoic acid to prepare 2-fluoro-4-[2-(trans-4-butylcyclohexyl)ethyl]benzoic acid 3,5-difluoro-4-cyanophenyl ester.

EXAMPLE 25

Example 21 was repeated except that 2-fluoro-4-[2-(trans-4-ethylcyclohexyl)ethyl]benzoic acid of Example 21 was replaced by 2-fluoro-4-[2-(trans-4-pentylcyclohexyl)ethyl]benzoic acid to prepare 2-fluoro-4-[2-(trans-4-pentylcyclohexyl)ethyl]benzoic acid 3,5-difluoro-4-cyanophenyl ester.

EXAMPLE 26

Example 21 was repeated except that 2-fluoro-4-[2-(trans-4-ethylcycloexyl)ethyl]benzoic acid of Example 21 was replaced by 2-fluoro-4-[2-(trans-4-hexylcyclohexyl)ethyl]benzoic acid to prepare 2-fluoro-4-[2-(trans-4-hexylcyclohexyl)ethyl]benzoic acid 3,5-difluoro-4-cyanophenyl ester.

EXAMPLE 27

Example 21 was repeated except that 2-fluoro-4-[2-(trans-4-ethylcyclohexyl)ethyl]benzoic acid of Example 21 was replaced by 2-fluoro-4-[2-(trans-4-heptylcyclohexyl)ethyl]benzoic acid to prepare 2-fluoro-4-[2-(trans-4-heptylcyclohexyl)ethyl]benzoic acid 3,5-difluoro-4-cyanophenyl ester.

EXAMPLE 28

Example 21 was repeated except that 2-fluoro-4-[2-(trans-4-ethylcyclohexyl)ethyl]benzoic acid of Example 21 was replaced by 2-fluoro-4-[2-(trans-4-octylcyclohexyl)ethyl]benzoic acid to prepare 2-fluoro-4-[2-(trans-4-octylcyclohexyl)ethyl]benzoic acid 3,5-difluoro-4-cyanophenyl ester.

EXAMPLE 29

Example 21 was repeated except that 2-fluoro-4-[2-(trans-4-ethylcyclohexyl)ethyl]benzoic acid of Example 21 was replaced by 2-fluoro-4-[2-(trans-4-nonylcyclohexyl)ethyl]benzoic acid to prepare 2-fluoro-4-[2-(trans-4-nonylcyclohexyl)ethyl]benzoic acid 3,5-difluoro-4-cyanophenyl ester.

EXAMPLE 30

Example 21 was repeated except that 2-fluoro-4-[2-(trans-4-ethylcyclohexyl)ethyl]benzoic acid of Example 21 was replaced by 2-fluoro-4-[2-(trans-4-decylcyclohexyl)ethyl]benzoic acid to prepare 2-fluoro-4-[2-(trans-4-decylcyclohexyl)ethyl]benzoic acid 3,5-difluoro-4-cyanophenyl ester.

EXAMPLE 31

A nematic liquid crystal composition A consisting of the following components was prepared:

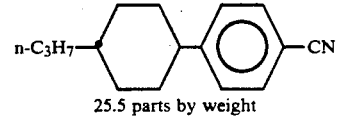

25.5 parts by weight

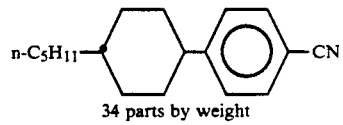

34 parts by weight

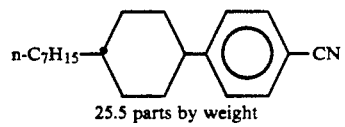

25.5 parts by weight

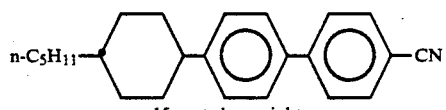

15 parts by weight

This nematic liquid crystal composition A exhibited an N-I point of 72.4° C., a dielectric anisotropy value $\Delta\epsilon$ of 11.0 ($\epsilon_{//}=15.4$ and $\epsilon_{\perp}=4.4$), a viscosity at 20° C. of 27.5 cp, an optical anisotropy value $\Delta n$ of 0.137 and a threshold voltage of 1.78 V.

A liquid crystal composition obtained by adding to the nematic liquid crystal composition A, 2-fluoro-4-[2-(trans-4-ethylcyclohexyl)ethyl]benzoic acid 3-fluoro-4- cyanophenyl ester (15 parts by weight) shown in Example 1 as a compound of the present invention exhibited an N-I point of 76.8° C., a dielectric anisotropy value Δε of 13.9, a viscosity at 20° C. of 39.6 cp, an optical anisotropy value Δn of 0.141 and a threshold voltage value of 1.58 V. This composition was allowed to stand in a freezer at −40° C. and for 30 days to observe the presence or absence of crystal deposition and observe its low temperature compatibility. As a result, no crystal deposition was observed.

EXAMPLE 32

Composition

To the liquid crystal composition A described above was added 2-fluoro-4-[2-(trans-4-pentylcyclohexyl)ethyl]benzoic acid 3,4-difluorophenyl ester (15 parts by weight) shown in Example 15 of the present invention to obtain a liquid crystal composition, which exhibited an N-I point of 73.8° C., a dielectric anisotropy value Δε of 11.2, a viscosity at 20° C. of 33.2 cp, an optical anisotropy value Δn of 0.133 and a threshold voltage value of 1.71 V. Further, when the same compatibility test as in Example 31 was carried out, no crystal deposition was observed.

EXAMPLES 33-38

Compositions

To the nematic liquid crystal composition A used in Example 31 were added compounds of the formula (I) obtained in Examples 3-5, 11, 13 and 14, each in 15 parts by weight, to obtain liquid crystal compositions. The N-I points and threshold voltage values of the compositions are shown in Table 1 together with the results of Examples 31 and 32.

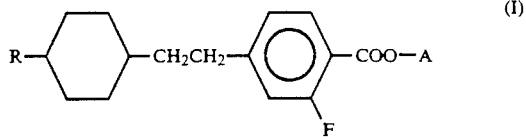

wherein R represents an alkyl group of 1 to 10 carbon atoms and A represents

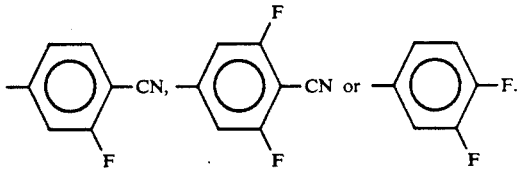

2. A liquid crystal composition comprising at least two components at least one of which is a benzoic acid derivative of the formula (I) as set forth in claim 1.

3. A benzoic acid derivative according to claim 1 wherein A represents a 3-fluoro-4-cyano group.

4. A benzoic acid derivative according to claim 3 wherein R represents an ethyl group.

5. A benzoic acid derivative according to claim 3 wherein R represents a propyl group.

6. A benzoic acid derivative according to claim 3 wherein R represents a butyl group.

7. A benzoic acid derivative according to claim 3 wherein R represents a pentyl group.

8. A benzoic acid derivative according to claim 1 wherein A represents a 3,4-difluorophenyl group.

9. A benzoic acid derivative according to claim 8

TABLE 1

| Example (Composition) | Compound used in formula (I) | | | N—I point (°C.) | Δε | Threshold voltage (V) |
|---|---|---|---|---|---|---|
| | R | A | Example | | | |
| 31 | $C_2H_5-$ | (4-cyano-3-fluorophenyl) | 1 | 76.8 | 13.9 | 1.58 |
| 33 | $n-C_3H_7-$ | | 3 | 80.9 | 13.5 | 1.68 |
| 34 | $n-C_4H_9-$ | | 4 | 79.3 | 13.5 | 1.61 |
| 35 | $n-C_5H_{11}-$ | | 5 | 80.4 | 13.5 | 1.70 |
| 36 | $C_2H_5-$ | (3,4-difluorophenyl) | 11 | 69.2 | 11.4 | 1.63 |
| 37 | $n-C_3H_7-$ | | 13 | 73.5 | 11.4 | 1.66 |
| 38 | $n-C_4H_9-$ | | 14 | 72.8 | 11.25 | 1.67 |
| 32 | $n-C_5H_{11}-$ | | 15 | 73.8 | 11.2 | 1.71 |
| Comp. ex. | Liquid crystal composition A | | | 72.4 | 11.0 | 1.78 |

The compounds of the present invention have a large positive dielectric anisotropy values (abbreviated to Δε) and a superior compatibility and reduce the threshold voltage values of the resulting liquid crystal cell. Further, use of the compounds of the present invention are very effective for broadening the mesomorphic range of the resulting liquid crystal compositions and reducing the driving voltages.

What we claim is:

1. A benzoic acid derivative expressed by the formula wherein R represents an ethyl group.

10. A benzoic acid derivative according to claim 8 wherein R represents a propyl group.

11. A benzoic acid derivative according to claim 8 wherein R represents a butyl group.

12. A benzoic acid derivative according to claim 8 wherein R represents a pentyl group.

13. A liquid crystal composition comprising at least two components, at least one of which comprises the compound of claim 4.

14. A liquid crystal composition comprising at least two components, at least one of which comprises the compound of claim 5.

15. A liquid crystal composition comprising at least two components, at least one of which comprises the compound of claim 6.

16. A liquid crystal composition comprising at least two components, at least one of which comprises the compound of claim 7.

17. A liquid crystal composition comprising at least two components, at least one of which comprises the compound of claim 9.

18. A liquid crystal composition comprising at least two components, at least one of which comprises the compound of claim 10.

19. A liquid crystal composition comprising at least two components, at least one of which comprises the compound of claim 11.

20. A liquid crystal composition comprising at least two components, at least one of which comprises the compound of claim 12.

* * * * *